United States Patent
Almási et al.

(10) Patent No.: US 12,295,092 B2
(45) Date of Patent: May 6, 2025

(54) EFFICIENT PRODUCTION OF HIGH-ENERGY ULTRASHORT ION-, ESPECIALLY PROTON BUNCHES

(71) Applicant: Pécsi Tudományegyetem, Pécs (HU)

(72) Inventors: Gábor Almási, Kozármisleny (HU); János Hebling, Pécs (HU); László Pálfalvi, Pécs (HU); Zoltán Tibai, Pécs (HU)

(73) Assignee: PÉCSI TUDOMÁNYEGYETEM, Pécs (HU)

( * ) Notice: Subject to any disclaimer, the term of this patent is extended or adjusted under 35 U.S.C. 154(b) by 446 days.

(21) Appl. No.: 17/614,828

(22) PCT Filed: May 29, 2020

(86) PCT No.: PCT/HU2020/050020
§ 371 (c)(1),
(2) Date: Nov. 29, 2021

(87) PCT Pub. No.: WO2021/033001
PCT Pub. Date: Feb. 25, 2021

(65) Prior Publication Data
US 2022/0240364 A1    Jul. 28, 2022

(30) Foreign Application Priority Data

May 29, 2019  (HU) .................................. P1900189

(51) Int. Cl.
H05H 15/00  (2006.01)
(52) U.S. Cl.
CPC .................................. H05H 15/00 (2013.01)
(58) Field of Classification Search
None
See application file for complete search history.

(56) References Cited

U.S. PATENT DOCUMENTS

| 9,497,848 | B2 | 11/2016 | Almási | |
| 2008/0111461 | A1* | 5/2008 | Liang | H05H 6/00 |
| | | | | 313/359.1 |

(Continued)

FOREIGN PATENT DOCUMENTS

| EP | 3217771 | 9/2017 |
| KR | 101574203 | 12/2015 |

(Continued)

OTHER PUBLICATIONS

Pálfalvi et al., Numerical investigation of a scalable setup for efficient terahertz generation using a segmented tilted-pulse-front excitation, Optics Express 25(24), 29560 (2017) (Year: 2017).*

(Continued)

*Primary Examiner* — Andrew Smyth
(74) *Attorney, Agent, or Firm* — Fitch, Even, Tabin & Flannery LLP

(57) ABSTRACT

The present specification relates to accelerating electrically charged particles. Gas is introduced into a vacuum chamber through at least one nozzle which opens into said vacuum chamber. Focusing an ionizing beam into the gas generates a plasma having a spatial distribution determined by the duration and manner of focusing the ionizing beam's laser pulses. Linearly polarized electromagnetic pulses of a wavelength at least ten times the wavelength of the ionizing beam's laser pulses tear electrons off the plasma, wherein said electromagnetic pulses include at most five optical cycles. The tearing-off of electrons is performed along a straight line defined by the resulting electric field strength of the electromagnetic pulses and simultaneously with the tearing-off of electrons, the positively charged particles of the remaining plasma with a net positive total charge are accelerated through exposure to Coulomb electrostatic forces.

14 Claims, 1 Drawing Sheet

(56) References Cited

U.S. PATENT DOCUMENTS

2012/0132827 A1* 5/2012 Fukuda .................. H01J 27/24
                                                      250/423 P
2017/0263410 A1* 9/2017 Fallahi .................. H05H 15/00

FOREIGN PATENT DOCUMENTS

| RU | 2013114678 | 10/2014 |
| WO | 2006046999 | 5/2006 |
| WO | 2013175248 | 11/2013 |
| WO | 2014019929 | 2/2014 |
| WO | 2021033001 | 2/2021 |

OTHER PUBLICATIONS

International Search Report for PCT/HU2020/050020 dated Apr. 14, 2021; 4 pages.
Written Opinion of the International Searching Authority for PCT/HU2020/050020 dated Apr. 14, 2021; 7 pages.
Hebling J. et al., "Velocity matching by pulse front tilting for large-area THz-pulse generation", Optics Express, (2002), vol. 10, No. 21; 6 pages.
A. Fülöp et al. entitled "Efficient Generation of THz Pulses with 0.4 mJ Energy" Optics Express, vol. 22., No. 17, Aug. 25, 2014; 9 pages.
B. Qiao et al. "Revisit on Ion Acceleration Mechanisms in Solid Targets Driven by Intense Laser Pulses" , Plasma Phys. Control. Fusion 61, 014039 2019. 14 pages.
M. Murakami et al., "Efficient Generation of Quasimonoenergetic Ions by Coulomb Explosions of Optimized Nanostructured Clusters" [Phys. Plasmas 16, 103108 (2009)], 7 pages.
T. Ditmire et al. "High-Energy Ions Produced in Explosions of Superheated Atomic Clusters" [Nature 398, 489 (1999)], 3 pages.
Last, et al. "Electron and Nuclear Dynamics of Molecular Clusters in Ultraintense Laser Fields I. Extreme Multielectron Ionization" [The Journal of Chemical Physics 120, 1336 (2004)], 13 pages.
T. Morita, "Laser Ion Acceleration by Using the Dynamic Motion of a Target" [Phys. Plasmas 20, 093107 (2013)], 11 pages.
L. Pálfalvi et al., "Numerical Investigation of a Scalable setup for Efficient Terahertz Generation Using a Segmented Tilted-Pulse-Front Excitation"; Optics Express, vol. 25, issue 24 pp. 29560-29573.

* cited by examiner

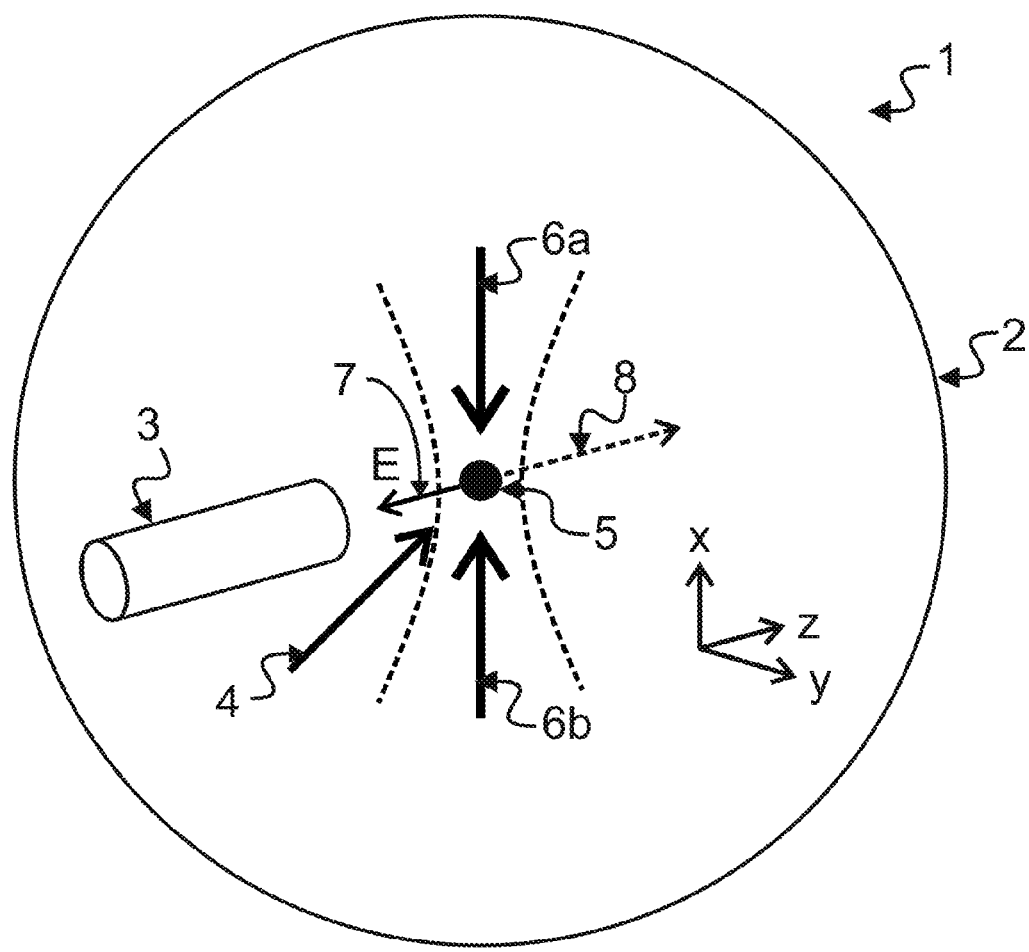

EFFICIENT PRODUCTION OF HIGH-ENERGY ULTRASHORT ION-, ESPECIALLY PROTON BUNCHES

CROSS REFERENCE TO RELATED APPLICATIONS

This application is the National Stage of International Application No. PCT/HU2020/050020, filed May 29, 2020, which claims the benefit of Hungarian Patent Application No. P1900189, filed May 29, 2019.

TECHNICAL FIELD

The present invention is directed to the acceleration of electrically charged particle bunches, that is, ion bunches, especially proton bunches.

BACKGROUND

Ion bunches (including proton bunches) with energies in the energy range of 10 keV to 20 MeV might be tools for important applications such as various material structure studies, nuclear transmutations, positron sources for PET examinations, or initiating nuclear fusion. In addition, said ion bunches can serve as sources of microwave accelerators. After post-acceleration, furthermore, proton therapy—as a medical application—can be an important application.

Directing laser beams of ultra-high intensity ($10^{15}$-$10^{22}$ W/cm$^2$) to a solid or gas target is a common technique for accelerating electrically charged particles. Laser ion acceleration (proton acceleration) dates back to nearly two decades. A paper by B. Qiao et al. in "*Revisit on ion acceleration mechanisms in solid targets driven by intense laser pulses*" [Plasma Phys. Control. Fusion 61, 014039 (2019)] provides an up-to-date overview of the study of the mechanisms occurring simultaneously in acceleration processes with high-intensity laser fields for solid targets. The various effects considered include the so-called Coulomb explosion which is the ultrafast dispersion of a volume of material with excess electric charge created previously by a laser beam due to the Coulomb interaction, i.e. the acceleration of ions that make up said volume of material. The authors of this paper study the dynamics of the various mechanisms for varying target thicknesses.

One of the promising applications of ions (proton, deuterium, tritium, other ions) created by Coulomb explosion is to produce fast neutrons to initiate nuclear fusion. Patent documents KR101574203B1 and WO2014/019929A1 proposes respective solutions. It should be emphasized that both documents assume multi-cycle laser pulses for the acceleration, and the use of single- or few-cycle laser pulses is not mentioned or even hinted at. Moreover, patent document RU2534507C1 specifically teaches a conventional laser acceleration technique, however, the Coulomb explosion process is not mentioned at all. Here, and from now on, a laser pulse in which the number of optical cycles is at most five is referred to as a few-cycle pulse, while laser pulses comprising more than five optical cycles will be referred to as multi-cycle laser pulses.

T. Ditmire et al. report in "*High-energy ions produced in explosions of superheated atomic clusters*" [Nature 398, 489 (1999)] on the experimental study of Coulomb explosion in xenon clusters (atomic cluster) and the determination of the ion energy distribution. The kinetic energy of the ions also reached the level of 1 MeV. This is four orders of magnitude higher than the energy of Coulomb explosion experiments with molecules. Using molecular and atomic clusters, ion energy values typically below 100 keV are reported by I. Last et al. in "*Electron and nuclear dynamics of molecular clusters in ultraintense laser fields I. Extreme multielectron ionization*" [The Journal of Chemical Physics 120, 1336 (2004)]. Like the above-referred papers, this paper also assumes the application of a laser source which emits multi-cycle ionizing laser pulses.

The peculiarity of the above-referred solutions is the spherically symmetrical nature of the expansion, which can be a disadvantage for many applications, making said applications difficult. In many applications, a particle beam of low divergence is advantageous, such a beam can be achieved from starting with a bunch of charge with a geometry differing from that of a sphere. T. Morita studies disk-shaped initial charge bunches in his simulations in "*Laser ion acceleration by using the dynamic motion of a target*" [Phys. Plasmas 20, 093107 (2013)]. This choice provides a more favorable directional distribution for applications. The two-layer disk target structure shown is particularly effective for accelerating ions of low mass numbers (protons). Simulation studies assumed 20 J pulses of extremely high power (500 TW) lasers. It should be here emphasized that the accelerating process is dominated by radiation pressure, with the Coulomb explosion responsible for only a small fraction of the accelerating effect. The energy distribution characteristic of the spherically symmetric Coulomb explosion, according to which the particle number density is proportional to the square root of the energy, varies advantageously: the distribution function peaks at about the average value of 200 MeV, and the width of the peak is preferably small, approx. 2%.

The results of the analytical calculations and the numerical simulations performed for spherically symmetric ion clusters by M. Murakami et al. show that a favorable effect on the ion energy distribution can be obtained if one starts with a homogeneous mixture of ions derived from two various types of atoms with significantly different masses, instead of a single atom; see in "*Efficient generation of quasimonoenergetic ions by Coulomb explosions of optimized nanostructured clusters*" [Phys. Plasmas 16, 103108 (2009)]. The peak of the energy distribution function shifts in the direction of large energy values, while its width decreases. By tuning the charge/mass ratios defined for each individual component in case of the two components, as well as the ratio of the charge densities, high-energy, essentially monoenergetic ions (i.e. with an energy variance being practically less than 1%) can be obtained.

To create Coulomb explosion, it is a requisite to remove the electrons that get released during ionization. To this end, high-energy multi-cycle laser pulses have been used in previous experiments and simulation studies. This is, however, disadvantageous as the removal of electrons takes place in a disordered manner, and not along a distinguished direction.

SUMMARY

It is an object of the present invention to remedy this problem, i.e. to increase the Coulomb explosion induced by removing the electrons released during ionization along a preferred direction.

In our studies, we have come to the surprising conclusion that this problem can be remedied by using ionizing laser pulses which consist of one or a few (at most five) optical cycles.

Far infrared (also known as terahertz, from now on THz) pulse generation techniques have undergone enormous development in the last decade. Due to the development and improvement of the so-called tilted-pulse-front excitation technique (details of which can be found, e.g., in J. Hebling et al., *"Velocity matching by pulse front tilting for a large area THz-pulse generation"* [Opt. Expr. 21, 1161 (2002)]), it is now possible to generate single-cycle THz pulses with energy in the range of a few mJ and a peak electric field strength of the order of 10 MV/cm in lithium niobate crystals (the details can be found, e.g., in J. A. Fülöp et al., *"Efficient generation of THz pulses with 0.4 mJ energy"* [Opt. Expr. 22, 20155 (2014)]). A recently designed pulse source based on a stair-step echelon-faced lithium niobate crystal (see, e.g., Gy. Tóth et al., *"Numerical investigation of a scalable setup for efficient terahertz generation using segmented tilted-pulse-front excitation"* [Opt. Expr. 25, 29560 (2017)]) is capable of generating a THz beam consisting of high-energy, single-cycle terahertz pulses and having a perfect beam profile; the main feature of said THz beam is its good focusability. By means of focusing, a peak electric field strength of 10 to 100 MV/cm can be achieved without distorting said beam profile, which allows efficient particle acceleration. It should be here also noted that, e.g., U.S. Pat. No. 9,497,848 teaches, as a solution based on a different concept, a method and a device for accelerating and manipulating particle acceleration by means of the evanescent field of THz pulses.

Terahertz pulses generated in lithium niobate (or other material with good nonlinear optical properties) are suitable for accelerating or manipulating electrically charged particles, especially protons, as in their case the peak electric field strength is in the range of MV/cm or larger;

the characteristic wavelength exceeds 300 micrometers (i.e. the frequency is below 1 THz), which corresponds to the characteristic size of the particle bunches to be ionized, allows a sufficient amount of charge to be accelerated and ensures synchronizability between the particles and the ionizing pulse;

single- or near-single-cycle pulses can be generated.

In our studies, it has also been found advantageous to make use of two different ion types with various mass/charge ratios in the proposed solution. In our experience, in accordance with the findings of M. Murakami et al., in *"Efficient generation of quasimonoenergetic ions by Coulomb explosions of optimized nanostructured clusters"* [Phys. Plasmas 16, 103108 (2009)] cited above, this choice also advantageously increases the kinetic energy of the generated charged particles or reduces the variance in their energy.

DETAILED DESCRIPTION

In what follows, the invention will be discussed in more details with reference to FIG. 1.

The electrically charged particle bunches (from now on, ion bunches) are generated in the sealed inner volume of a vacuum chamber 2 of a setup 1 for efficient production of high-energy ultrashort ion, preferably proton bunches, into which a gas flow is introduced through a nozzle 3 from a suitable source of material (not shown). The gas is provided as atomic or molecular gas. To generate the ion bunches, preferably, hydrogen gas is used, of course gases of other material quality can equally be used. The incoming gas is ionized by an ionizing beam 4 obtained by focusing a laser pulse with a duration of less than 2.0 picoseconds and a wavelength of less than 2.5 micrometers, i.e. falling typically in the near infrared, visible or ultraviolet range; said ionizing beam 4 is introduced into the vacuum chamber 2 in a manner known by a person skilled in the art. Said laser pulse is generated by a suitable laser source. Focusing said laser pulse is performed by a suitable focusing device (not shown in the drawing) known to a person skilled in the art. The spatial distribution of the plasma 5 obtained by ionization in the vacuum chamber 2, i.e. the geometry of the plasma volume, is set by properly choosing the duration of the ultrashort laser pulse generated by the laser source, by properly focusing said laser pulse, that is, by suitably choosing the beam neck and the Rayleigh length. An elongated plasma volume is created by focusing a longer (in duration) laser pulse, while a substantially spherically symmetrical plasma volume is created by focusing a shorter laser pulse. Given the material quality of the gas used and knowing the parameters of the laser source for generating said laser pulse, it is obvious to a person skilled in the art to choose and set the above-referred parameters of the required focusing. To focus laser pulses in practice, a great number of techniques is known in the art (see, e.g., the text book by T. Verdeyen, *Laser Electronics* [ISBN-13: 978 0137066667]).

Regarding the geometry of the plasma volume, the present invention encompasses cases wherein the plasma volume is nearly spherical or has a flat shape that can be approximated by a disk or ellipsoid—these geometries are of high relevance in terms of practical applications. After generating the plasma 5, as the next step, the electrons are torn off, i.e. removed, from the plasma 5. To this end, the electromagnetic fields of linearly polarized THz electromagnetic pulses 6a, 6b with identical beam properties propagating towards each other is used as being superimposed into a standing wave in such a way that, in said field, the electric field strengths of the two pulses add up and the magnetic field strengths of the two pulses cancel out each other (i.e. the resulting magnetic field strength is zero). The condition for operation is that the ratio of the central wavelength of the pulses 6a, 6b to the dimension of the plasma 5 along the propagation direction of the THz pulses 6a, 6b is at least two. As an example: for a plasma 5 with a spatial dimension of 250 μm, according to the condition, a wavelength of at least 500 μm is required. The electromagnetic pulses needed for generating the standing wave in question are produced by e.g. two suitable electromagnetic pulse generators synchronized with one other, or provided by e.g. a synchronized optical splitting of a single electromagnetic pulse that is produced by a suitable single electromagnetic pulse generator. Preferably, the electromagnetic pulse generator comprises a pulse source based on a stair-stepped echelon-faced lithium niobate crystal, and the generation of the THz pulses 6a, 6b takes place in the electromagnetic pulse generator by a tilted-pulse-front excitation technique known in the art.

The peculiarity of this technical solution is that the resulting electric field (E) of the THz pulses 6a, 6b has a direct role in said removal of the electrons, in contrast to the previously known solutions, wherein the ponderomotive force plays a decisive role in the removal. A feature and a great advantage of the invention is that the removal of electrons (contrary to the prior art solutions) is carried out not in a disordered manner, but in an ordered manner, along a straight line which is defined by a resulting electric field vector characterizing the electric field 7 of the electromagnetic pulses 6a, 6b (i.e. directive removal is performed), as is indicated in FIG. 1 by the direction 8 of movement of the electrons.

In our studies, we have come to the conclusion that to effect the Coulomb explosion simultaneously with the directive removal of free electrons of the plasma 5 created, electromagnetic pulses 6a, 6b with the following properties are suitable:

their peak electric field strength exceeds 1 MV/cm;
  their frequency is in the THz range, i.e. between 0.1 and 10 THz, their wavelength is preferably at least ten times the wavelength of the laser pulses used for the ionization;
  they consist of a single or a nearly-single, but at most five, optical cycles.

This is because efficient electron removal is possible with an electric field strength of at least in the order of MV/cm, which can be achieved in the frequency range of 0.1 to 10 THz by the methods discussed above. Furthermore, the range of cycle times belonging to this frequency range allows the removal of electrons during a single optical period. The advantage of applying single- or few-cycle pulses versus multi-cycle pulses is that the electrons can be removed from the plasma along a well-defined direction, which direction is much less disrupted by a change (alternation) taking place less frequently in the direction of the electric field strength of the single- or few-cycle pulses than in case of multi-cycle pulses.

Nowadays, THz electromagnetic pulses with the features allowing practicing of the invention can be generated in lithium niobate. Other materials with nonlinear optical properties, such as lithium tantalate or various semiconductors, are also suitable for this purpose.

After the directive removal of electrons from the plasma 5, the remaining positively charged particle cloud spreads over due to the Coulomb interaction (i.e. Coulomb explosion takes place), thereby the kinetic energy of the particles increases. Due to the feature of the invention that the electrons are torn off in an ordered manner, an additional advantage is obtained: the electrostatic field of the electron bunch formed by the electrons torn off by ionization also contributes to the acceleration of the ions (protons). In our studies, it has been found that, as a result, the positively charged particles gain an additional energy increment in the order of 10 keV to a few times 10 MeV.

In our studies, it has also been found that the acceleration of the positively charged particles, especially protons, can be made more efficient if the plasma 5 contains other ions of higher mass number (e.g. carbon) in addition to the positively charged particles to be accelerated. Thus, the present invention is also advantageous in such cases wherein the plasma 5 contains more than one types of ion. Accordingly, in a possible preferred embodiment of the invention, two gases of different material quality are introduced into the vacuum chamber 2, preferably through two nozzles 3 arranged in close proximity to one another, wherein each nozzle is connected with a source of gas of different material quality.

In our studies, it has also been found that the particle number distribution in terms of energy differs favorably from the square root distribution for the possible applications, and also has a smaller variance in energy.

An important further advantage of the solution according to the invention, e.g. over microwave accelerators, is that the setup 1 suitable/necessary for carrying out the process for accelerating charged particles is small and compact, and can be operated in a cost-effective manner in either continuous or batch mode.

The invention claimed is:

1. A method for accelerating electrically charged particles, the method comprising:
   introducing gas into a vacuum chamber (2) through at least one nozzle (3) opening into said vacuum chamber (2);
   focusing an ionizing beam (4) of laser pulses with a duration and wavelength into the gas, thereby ionizing said gas in the vacuum chamber (2) to generate a plasma (5) comprising electrons and positively charged particles, the plasma (5) having a spatial distribution determined by the duration and a manner of focusing the laser pulses of the ionizing beam;
   tearing off a majority of the electrons from the thus obtained plasma (5) by electromagnetic pulses (6a, 6b) with identical beam properties propagating towards each other and superimposed into a standing wave such that the electric field strengths of electromagnetic pulses (6a, 6b) add up and the magnetic field strengths of the electromagnetic pulses (6a, 6b) cancel and having a wavelength at least ten times the wavelength of the laser pulses of the ionizing beam, said electromagnetic pulses (6a, 6b) being linearly polarized and comprised of at most five optical cycles, said tearing-off of electrons being performed along a straight line defined by a net electric field strength (7) of the electromagnetic pulses (6a, 6b) applied; and
   simultaneously with the tearing-off of electrons, accelerating the positively charged particles of the remaining plasma (5) by Coulomb electrostatic forces arising among the positively charged particles thereby making the positively charged particles to repel each other.

2. The method according to claim 1, further comprising producing by ionizing the gas, a substantially spherical shape for the plasma (5).

3. The method according to claim 1, wherein the gas introduced into the vacuum chamber (2) through the at least one nozzle (3) consists of one type of atoms.

4. The method according to claim 1, wherein the gas introduced into the vacuum chamber (2) through the at least one nozzle (3) comprises at least two types of atoms.

5. The method according to claim 4, further comprising using separate nozzles to introduce gases of different material quality into the vacuum chamber (2).

6. The method according to claim 5, wherein the separate nozzles are arranged in close proximity to one another.

7. The method according to claim 1, wherein the laser pulses of the ionizing beam (4) have a duration of at most 2.0 picoseconds and a wavelength of at most 2.5 micrometers.

8. The method according to claim 1, wherein the electromagnetic pulses (6a, 6b) used for tearing off the electrons from the plasma (5) are generated by tilted-pulse-front excitation technique.

9. The method according to claim 1, wherein each of the electromagnetic pulses (6a, 6b) used for tearing off the electrons from the plasma (5) comprises a single optical cycle.

10. The method according to claim 1, wherein the electrically charged particles are protons.

11. An apparatus for accelerating electrically charged particles, the apparatus comprising:
    a vacuum chamber (2) with an inner volume enclosed thereby in an airtight manner;
    at least one nozzle (3) arranged to open into the inner volume of the vacuum chamber (2);
    at least one gas source, wherein individual ones of the at least one gas source is in gaseous communication with at least one nozzle (3) for introducing gas into the vacuum chamber (2) from the at least one gas source;

a laser source configured to generate at least one laser pulse forming an ionizing beam (4) in the gas introduced into the vacuum chamber (2) and thereby converting the gas into plasma (5), wherein said plasma (5) is composed of particles with a net positive charge and electrons obtained by ionizing the gas; and an electromagnetic pulse generator configured to generate electromagnetic pulses (6a, 6b) with identical beam properties propagating towards each other and superimposed into a standing wave such that electric field strengths of the electromagnetic pulses (6a, 6b) add up and magnetic field strengths of the electromagnetic pulses (6a, 6b) cancel and the electromagnetic pulses (6a, 6b) are capable of tearing off electrons from the plasma (5), the electromagnetic pulses (6a, 6b) being linearly polarized electromagnetic pulses comprised of at most five optical cycles and having a wavelength at least ten times a wavelength of the laser pulses generated by the laser source.

12. The apparatus according to claim 11, wherein the laser source is configured to generate laser pulses with a duration of at most 2.0 picoseconds and a wavelength of at most 2.5 micrometers.

13. The apparatus according to claim 11, wherein the electromagnetic pulse generator is an electromagnetic pulse generator configured to provide electromagnetic pulses comprising a single optical cycle.

14. The apparatus according to claim 11, wherein the electromagnetic pulse generator comprises a pulse source based on a stair-stepped echelon-faced lithium niobate crystal.

* * * * *